(12) United States Patent
Cho et al.

(10) Patent No.: US 7,876,976 B2
(45) Date of Patent: Jan. 25, 2011

(54) METHOD AND APPARATUS FOR RESIZING IMAGES USING DISCRETE COSINE TRANSFORM

(75) Inventors: Nam-ik Cho, Seoul (KR); Chan-yul Park, Gwangju Metropolitan (KR)

(73) Assignees: Seoul National University Industry Foundation, Seoul (KR); Samsung Electronics Co., Ltd., Gyeonggi-do (KR)

( * ) Notice: Subject to any disclaimer, the term of this patent is extended or adjusted under 35 U.S.C. 154(b) by 1007 days.

(21) Appl. No.: 11/709,724

(22) Filed: Feb. 23, 2007

(65) Prior Publication Data

US 2007/0237414 A1 Oct. 11, 2007

(30) Foreign Application Priority Data

Feb. 23, 2006 (KR) .................. 10-2006-0017881

(51) Int. Cl.
*G06K 9/36* (2006.01)
(52) U.S. Cl. ...................................... 382/276; 382/250
(58) Field of Classification Search ................ 345/472, 345/472.1, 660, FOR. 149, 150, 220; 348/14.13, 348/445, 556, 581, E5.055, E5.111, 913; 358/1.2, 3.2, 451, 528, FOR. 143, 177; 375/E7.028, 375/E7.143, E7.226, E7.23; 382/166, 232, 382/233, 235, 244, 248, 250, 276, 298; 396/436; 702/88; 708/203, 208, 402; 715/252, 788, 715/798, 800, 815, FOR. 192
See application file for complete search history.

(56) References Cited

U.S. PATENT DOCUMENTS

| 5,394,249 | A  | * | 2/1995  | Shimoda et al. | 386/124 |
| 6,263,119 | B1 | * | 7/2001  | Martucci       | 382/298 |
| 6,792,149 | B1 | * | 9/2004  | Florencio      | 382/233 |
| 2004/0015525 | A1 | * | 1/2004  | Martens et al. | 708/208 |
| 2006/0269147 | A1 | * | 11/2006 | Shen et al.    | 382/232 |

FOREIGN PATENT DOCUMENTS

| JP | 2000-041252 | | 2/2000 |
| JP | 2000-244917 | | 9/2000 |
| KR | 10-2004-0063650 | | 7/2004 |
| WO | WO 03056837 A1 | * | 7/2003 |

* cited by examiner

*Primary Examiner*—Bhavesh M Mehta
*Assistant Examiner*—Gregory F Cunningham
(74) *Attorney, Agent, or Firm*—Harness, Dickey, & Pierce, P.L.C.

(57) ABSTRACT

A method for resizing an image using a resizing ratio may include receiving DCT (Discrete Cosine Transform) coefficients of an input image; calculating a transformation matrix for transforming the input image to an integer aspect ratio closest to the resizing ratio; performing a coarse resizing on the input image in a DCT domain using the transformation matrix; obtaining a spatial image by performing an IDCT (Inverse Discrete Cosine Transform) on the coarse-resized domain; and forming an output image by performing a fine resizing on the spatial image in a spatial domain.

20 Claims, 7 Drawing Sheets

METHOD AND APPARATUS FOR RESIZING IMAGES USING DISCRETE COSINE TRANSFORM

PRIORITY STATEMENT

This U.S. non-provisional application claims the benefit of priority under 35 U.S.C. §119 from Korean Patent Application No. 10-2006-0017881, filed on Feb. 23, 2006, in the Korean Intellectual Property Office (KIPO), the disclosure of which is incorporated herein in its entirety by reference.

BACKGROUND

1. Field

Example embodiments relate to a method and apparatus for resizing an image using a discrete cosine transform (DCT), for example, for upscaling and/or downscaling an input image to any vertical and/or horizontal resizing ratio.

2. Description of the Related Art

Various methods of compressing image data have been introduced to may attempt to meet the demands of multimedia technologies. Image compression technologies may be widely used in a diverse range of technology fields. For example, image compression may be used in the field of satellite broadcasting to transmit a large amount of data over a channel having a limited transmission band. The current transmission band of one channel allocated for satellite broadcasting is 27 MHz. About 30 to 50 Mbps of data for digital broadcasting may be transmitted in such a transmission band. However, if image compression technology is applied to satellite broadcasting, image data corresponding to the above data transmissions may be transmitted using only a bit rate of 5 Mbps. For example, image compression technology may allow about 6 to 10 programs to be simultaneously transmitted over a transmission band of one channel. Furthermore, the required capacity of supplementary equipment, for example, a memory, for storing data may be reduced using image compression technology. Thus, image compression technology may allow high-quality image data to be stored at reduced cost.

Various image compression methods have been introduced. Widely used conventional image compression methods may include a method of compressing an image using spatial correlation of one image frame, a method of compression an image using temporal correlation between consecutive image frames, and a method of compressing an image using code occurrence probability in image frames are widely used.

FIG. 1 is a block diagram of a conventional method of encoding and decoding an image using spatial correlation.

Referring to FIG. 1, a transmitter 110 may encode an original image and may transmit the encoded image. A DCT unit 120 may transform the original image by performing a discrete cosine transform (DCT). The DCT may be one of an orthogonal transformation scheme, which may be employed by various international standards, for example, joint photographic experts group (JPEG) and motion picture experts group (MPEG). The DCT may be used to minimize data loss for image data compression. For example, if the DCT is performed, entropy may be reduced by concentrating image information in a low frequency domain. Because a dominating portion of image data may be concentrated at the low frequency domain, image data loss may be minimized even if a high frequency domain is lost. Therefore, by performing the DCT, image data may be compressed without sustaining a substantial loss of image information.

A quantizing unit 130 may quantize the transformed image data. A quantization operation may divide orthogonal-transformed frequency components by a quantization step size. If the quantization step size is increased, the compressibility may be increased because all terms may become close to zero, however, larger errors may be produced. If the quantization step size is too small, the compressibility may be decreased.

An entropy encoder 140 may encode the quantized image data. The entropy encoder 140 may assign a short code to a value having higher occurrence probability and may assign a comparatively-longer code to a value having lower occurrence probability, so as to reduce an average code length.

The encoded signal may be transmitted to a receiver 190 over a predetermined communication channel 150. An entropy decoder 160 may decode the encoded signal and a de-quantization unit 170 may de-quantizes the decoded signal.

Because various types and forms of displays are used, the image data may need to be resized according to an aspect ratio supported by a corresponding display that may be used to display the image data. For example, if a personal multimedia player (PMP) that reproduces an image through a 3.5 inch display receives a digital multimedia broadcasting image that is produced for a 7 inch display, the PMP may downscale the size of the received image.

FIG. 2 is a block diagram of a conventional method of resizing an image in a spatial domain.

Referring to FIG. 2, a received image may be decoded to a spatial domain signal. The spatial domain signal may be resized by a spatial interpolation unit 250. For example, a bilinear interpolation or a bicubic interpolation may be used for resizing in a spatial domain.

A larger amount of calculation may be required when performing a discrete cosine transformation (DCT), thus in order to reduce the amount of calculation required, a method of resizing a received signal in a DCT domain may be introduced.

FIG. 3 is a block diagram of a conventional method of resizing an image in a DCT domain. As shown in FIG. 3, for example, an 8×8 input image may be transformed to a 4×4 output image.

Referring to FIG. 3, a 4×4 DCT interpolation unit 310 may directly resize an 8×8 DCT signal in the DCT domain without transforming the 8×8 DCT signal in a spatial domain. In the resizing operation, a method of deleting high frequency coefficients from the input DCT coefficients may be used. For example, only low frequency coefficients of the input DCT coefficients may remain after the resizing operation. A 4×4 inverse-DCT (IDCT) unit 350 may transform the resized image data to a spatial domain signal.

As described above, the amount of calculation required may be reduced by directly resizing the image data in the DCT domain. Further, a peak signal to noise ratio (PSNR) may be improved compared to a conventional method of resizing the image data in the spatial domain.

However, a conventional method of resizing image data in a DCT domain may be applicable only for limited resizing ratios. For example, a conventional method of resizing an image data in a DCT domain may be limited to transform an 8×8 input image to a 4×4 output image or a 2×2 output image only. In order to resize an image into any other desired ratio, a conventional method may require a very complicated structured system for resizing the image data. It may be difficult to apply a higher-speed algorithm in such a conventional method of resizing the image data.

Further, a conventional method of resizing an image data in the DCT domain may only be used when a vertical resizing ratio and a horizontal resizing ratio of the input image are identical.

Accordingly, there may be a demand for developing a method of resizing an image data to any combination of target resizing ratios.

SUMMARY

Example embodiments may provide a method and apparatus for resizing an input image by performing a course resizing and a fine resizing on an input image.

Example embodiments may provide a method and apparatus for resizing an input image to a resizing ratio by independently resizing the input image data in a DCT domain and a spatial domain.

Example embodiments may provide a method and apparatus for resizing an input image to a resizing ratio having a vertical resizing ratio different from a horizontal resizing ratio.

In an example embodiment, a method of resizing an image using a resizing ratio may include receiving DCT (discrete cosine transform) coefficients of an input image; calculating a transformation matrix for transforming the input image to an aspect ratio closest to the resizing ratio; performing a coarse resizing on the input image in a DCT domain using the transformation matrix; obtaining a spatial image by performing an inverse discrete cosine transform (IDCT) on the coarse-resized domain; and forming an output image by performing a fine resizing on the spatial image in a spatial domain.

According to an example embodiment, calculating the transformation matrix may include calculating N' that satisfies Y:y=N:N' and calculating M' that satisfies X:x=M:M'; selecting integers closest to the calculated N' and M' as N" and M"; and calculating an N"×N" transformation matrix and an M"×M" transformation matrix. Y denotes the number of pixels in a vertical direction of the input image, X denotes the number of pixels in a horizontal direction of the input image, y denotes the number of pixels in a vertical direction of the output image, x denotes the number of pixels in a horizontal direction of the output image, and N and M denote a ratio of vertical to horizontal lines of a supportable DCT filter.

According to an example embodiment, performing the coarse resizing may include calculating an N"×M" transformation matrix of the input image using the N"×N" transformation matrix and the M"×M" transformation matrix.

According to an example embodiment, performing the fine resizing may include obtaining the output image by performing one of a bilinear filter and a bicubic filtering on the N"×M" transformation matrix.

According to an example embodiment, the N"×N" transformation matrix and the M"×M" transformation matrix may be formed by extracting a portion of DCT coefficients of an N×M macro block. In performing the coarse resizing, the input image may be downscaled by performing a decimation on the input image using the N"×N" transformation matrix and the M"×M" transformation matrix.

According to an example embodiment, the N"×N" transformation matrix and the M"×M" transformation matrix may be formed by padding zeroes in the DCT coefficients of an N×M macro block. In performing the coarse resizing, the input image may be upscaled by performing an interpolation on the input image using the N"×N" transformation matrix and the M"×M" transformation matrix.

According to an example embodiment, the supportable DCT filter may be an 8×8 DCT filter.

According to an example embodiment, the N" and the M" may be integers closest to the values of N' and M' and may be greater than the values of N' and M'.

According to an example embodiment, the horizontal and vertical resizing ratios may be the same.

According to an example embodiment, the horizontal resizing ratio may be different from the vertical resizing ratio.

In an example embodiment, an apparatus for resizing an input image may include a receiver for receiving DCT (discrete cosine transform) coefficients of an input image; a transformation matrix calculating unit for calculating a transformation matrix for transforming the input image using an integer aspect ratio closest to the resizing ratio; a coarse resizing unit for performing a coarse resizing on the input image in a DCT domain using the transformation matrix; an IDCT (inverse discrete cosine transform) unit for obtaining a spatial image by performing an IDCT on the coarse-resized domain; and a fine resizing unit for forming an output image by performing a fine resizing on the spatial image in a spatial domain.

According to an example embodiment, the transformation matrix calculation unit may calculate N' that satisfies Y:y=N:N' and calculating M' that satisfies X:x=M:M', select integers closest to the calculated values of N' and M' as N" and M", and calculating an N"×N" transformation matrix and an M"×M" transformation matrix. Y denotes the number of pixels in a vertical direction of the input image, X denotes the number of pixels in a horizontal direction of the input image, y denotes the number of pixels in a vertical direction of the output image, x denotes the number of pixels in a horizontal direction of the output image, and the N and the M denote a ratio of vertical to horizontal lines of a predetermined DCT filter.

According to an example embodiment, the coarse resizing unit may calculate an N"×M" transformation matrix from the input image using the N"×N" transformation matrix and the M"×M" transformation matrix.

According to an example embodiment, the fine resizing unit may obtain the output image by filtering using one of a bilinear filter and a bicubic filter on the N"×M" transformation matrix.

According to an example embodiment, the N"×N" transformation matrix and the M"×M" transformation matrix may be formed by extracting a portion of DCT coefficients of an N×M macro block. The coarse resizing unit may downscale the input image by performing a decimation on the input image using the N"×N" transformation matrix and the M"×M" transformation matrix.

According to an example embodiment, the N"×N" transformation matrix and the M"×M" transformation matrix may be formed by performing a zero padding on an N×M macro block. The coarse resizing unit may upscale the input image by performing a decimation on the input image using the N"×N" transformation matrix and the M"×M" transformation matrix.

According to an example embodiment, the supportable DCT filter may be an 8×8 DCT filter.

According to an example embodiment, the values of N" and M" may be integers closest to the values of N' and M' and may be greater than the values N' and M'.

According to an example embodiment, the horizontal and vertical resizing ratios may be the same.

According to an example embodiment, the horizontal resizing ratio may be different from the vertical resizing ratio.

BRIEF DESCRIPTION OF THE DRAWINGS

Example embodiments will be described with reference to the accompanying drawings.

DESCRIPTION OF EXAMPLE EMBODIMENTS

Figure 1:
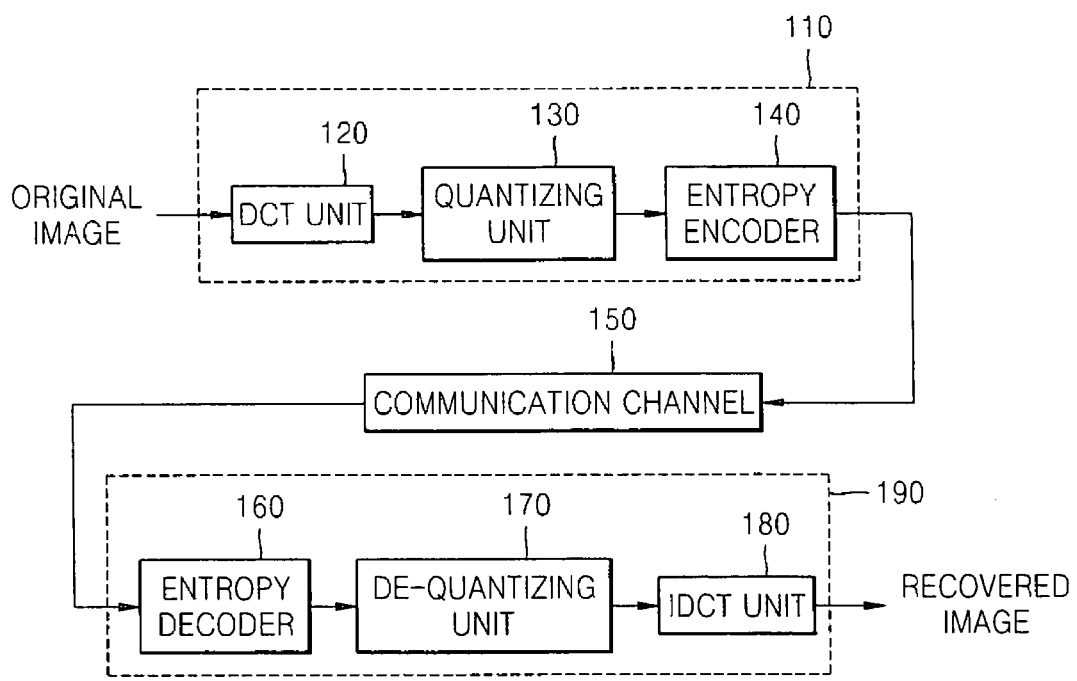
FIG. 1 is a block diagram of a conventional method of encoding and decoding an image.
Figure 2:
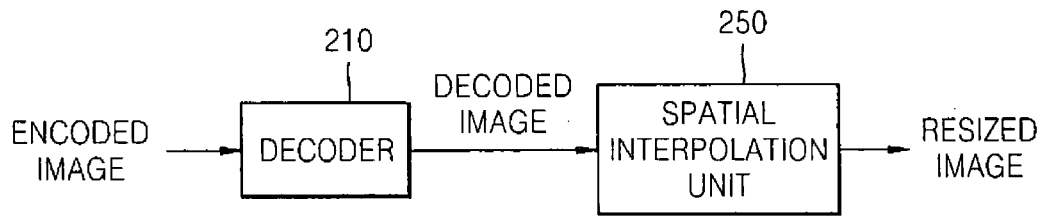
FIG. 2 is a block diagram of a conventional method of resizing an image in a spatial domain.
Figure 3:
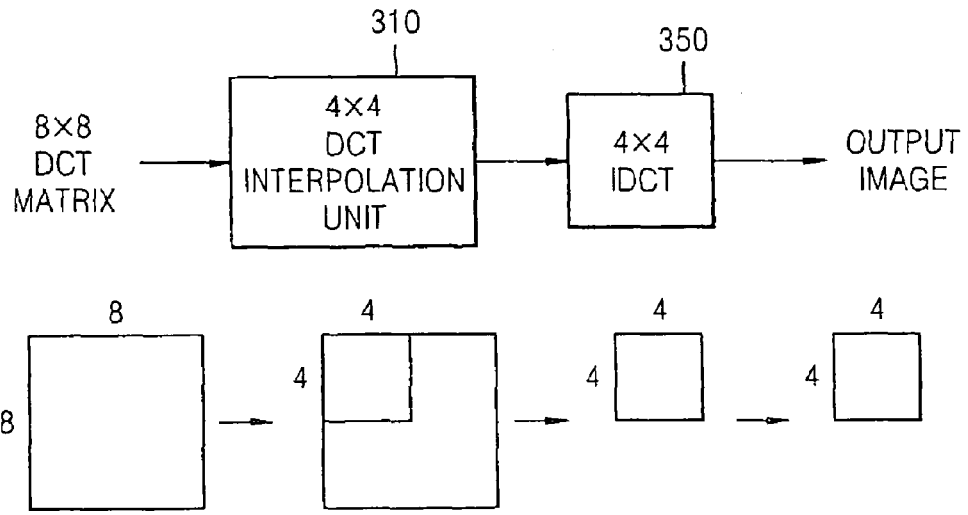
FIG. 3 is a block diagram of a conventional method of resizing an image in a DCT domain.

Example embodiments are described more fully hereinafter with reference to the accompanying drawings, in which example embodiments are shown. Example embodiments may, however, be embodied in many different forms and should not be construed as limited to the embodiments set forth herein. Rather, these embodiments are provided so that this disclosure will be thorough and complete and will fully convey the scope of example embodiments to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements and/or components, but do not preclude the presence or addition of one or more other features, integers, steps, operations, elements, components and/or groups thereof.

Example embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 4:
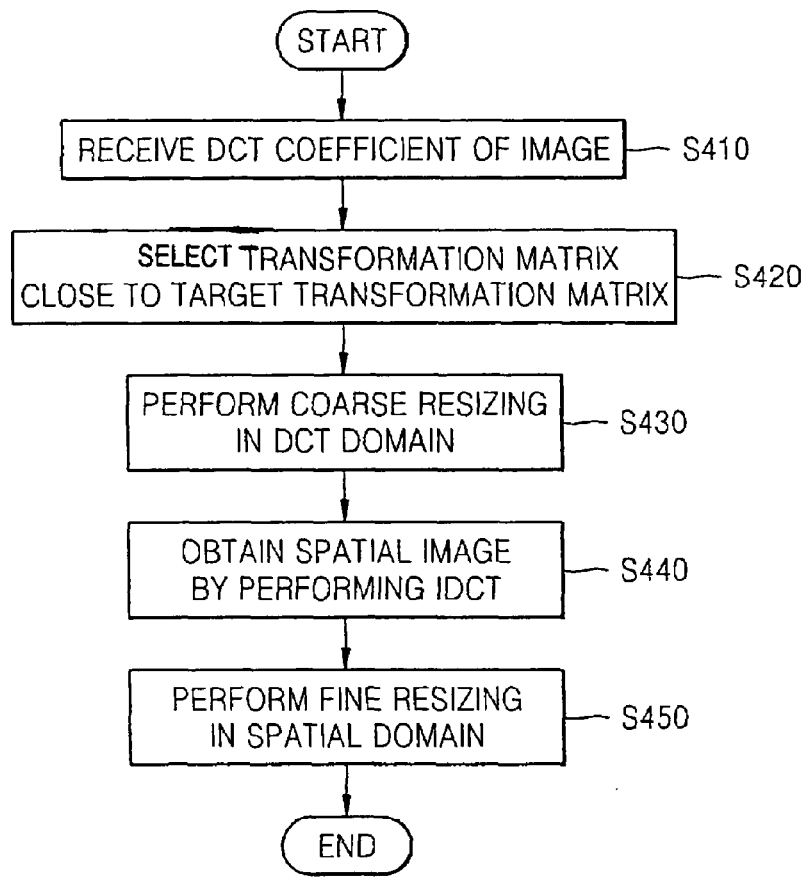
FIG. 4 is a flowchart of a method of resizing an image according to an example embodiment.

FIG. 4 is a flowchart of a method of resizing an image according to an example embodiment.

Referring to FIG. 4, a method of resizing an image may include receiving DCT coefficients of the image (operation S410), calculating a transformation matrix close to a target transformation matrix (operation S420), performing a coarse resizing in a DCT domain (operation S430), obtaining a spatial image by performing an IDCT (S440), and performing fine resizing in the spatial domain (operation S450).

In operation S410, an input image may be received. The received input image may be in the form of a matrix composed of DCT coefficients. In operation S420, a transformation matrix may be calculated for resizing the received image to a predetermined or given resizing ratio. An operation for selecting the transforming matrix will be described with reference to the resizing operation illustrated in FIG. 5.

In an example embodiment, the transformation matrix may be used to resize an input image directly in a DCT domain. In an example embodiment, the transformation matrix may not be used for resizing the input image directly to a resizing ratio, instead, the calculated transformation matrix may be used for resizing the input image to an aspect ratio close to the resizing ratio.

In operation S430, a coarse resizing may be performed in a DCT domain using the transformation matrix. For example, the coarse resizing may be a rough or approximate resizing. The coarse resizing may be an operation for resizing an image to an aspect ratio close to the predetermined or given resizing ratio.

A method of resizing an input image according to an example embodiment will be described using a 3:1 resizing ratio as an example. However, example embodiments of the method of resizing an input image are not limited thereto.

A transformation matrix may be calculated in order to perform the coarse resizing on the input image. For example, to obtain a resizing ratio corresponding to 3:1 using a modularized 8×8 DCT filter, x may be calculated to determine the resizing ratio that satisfies the formula 3:1=8:x. Here, calculation of the formula may return the value of x to be 2.67. In operation S420, a 3×3 transformation matrix may be selected because an integer 3 is an integer closest to 2.67. For example, the integer 3 may be selected under an assumption that a 3×3 IDCT is supported. However, if a 4×4 IDCT is supported instead of the 3×3 IDCT, an integer 4 may be selected.

In operation S430, the coarse resizing may be performed on the input image to transform the 8×8 DCT coefficient matrix of the input image to the 3×3 matrix using the 3×3 transformation matrix.

In operation S440, an IDCT may be performed on the coarsely resized image data to transform the input image to a spatial domain. For example, any conventional IDCT schemes may be used in operation S440.

In operation S450, a fine resizing may be performed. The fine resizing may be an operation for resizing the coarsely resized image data to a target resizing ratio. According to the example detailed above, the target resizing ratio may be 8:2.67 and the resizing ratio used in the coarse resizing may be 8:3, thus the fine resizing ratio of 3:2.67 may be used to transform the coarsely resized image data to finely resized image data.

Operation S450 may be performed in the spatial domain. For example, a bilinear interpolation or a bicubic interpolation may be used. A bilinear interpolation or a bicubic interpolation may provide better performance if the resizing ratio is close to 1:1, thus the fine resizing may be performed after coarse resizing is performed on the input image.

As described above, a method of resizing an input image according to an example embodiment may reduce the complexity of resizing by performing the coarse resizing in the DCT domain and performing the fine resizing in the spatial domain. Further, a method of resizing an input image according to an example embodiment may be used to resize an image to any predetermined or given resizing ratio.

According to an example embodiment as shown in FIG. 4, a method of resizing may involve calculating a square matrix that allows an 8×8 DCT filter to be used as the transformation matrix. However, example embodiments are not limited thereby. Because a two-dimensional DCT scheme may be equivalent to performing a one-dimensional DCT scheme two times, an input image may be resized having different vertical and horizontal resizing ratios. A method of resizing an input image to have a vertical ratio different from a horizontal ratio according to an example embodiment will be described with reference to FIG. 5.

Figure 5:
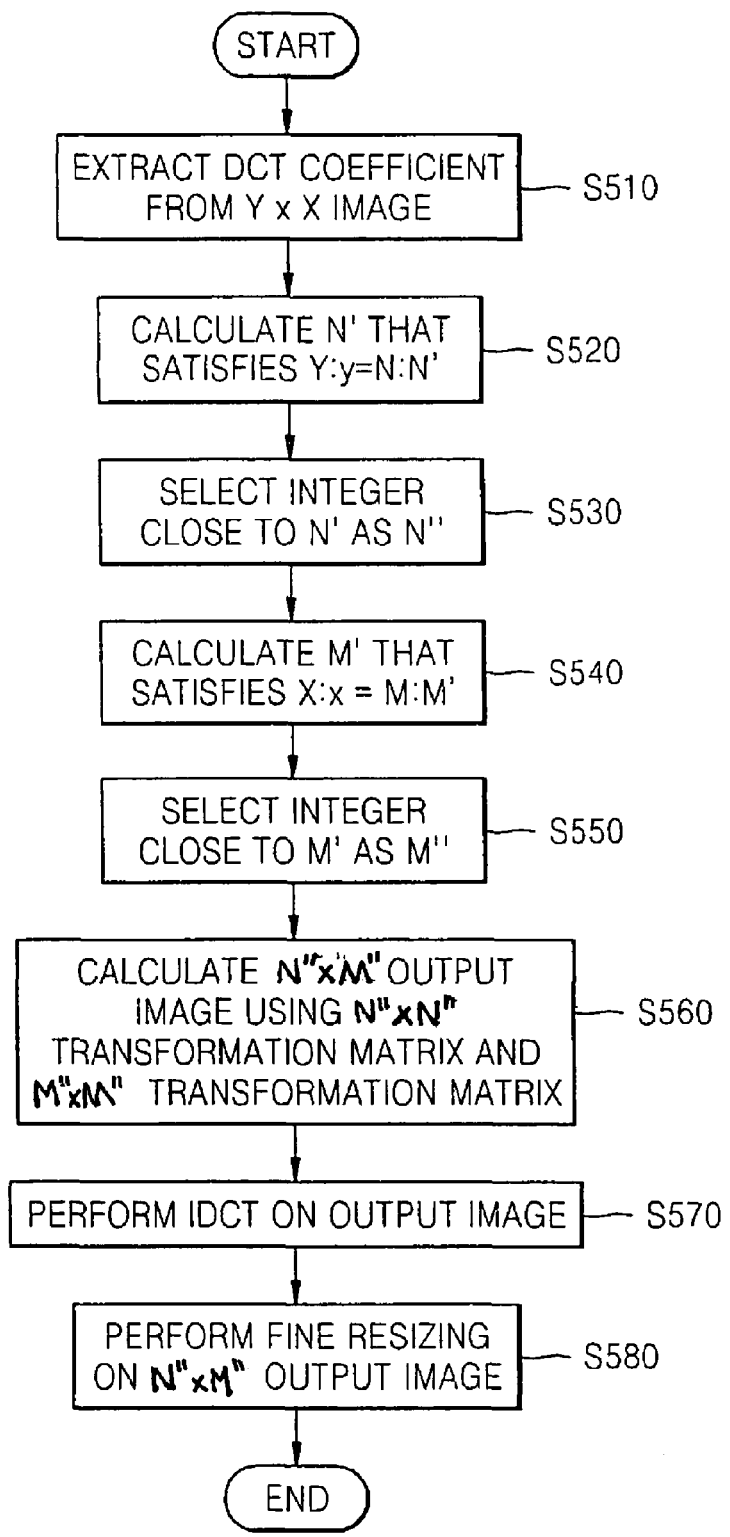
FIG. 5 is a flowchart of a resizing method using different vertical and horizontal resizing ratios according to an example embodiment.

FIG. 5 is a flowchart of a resizing method using different vertical and horizontal resizing ratios according to an example embodiment.

The flowchart of FIG. 5 describes an operation of downscaling an X×Y input image to an x×y output image. For example, X×Y denotes the dimensions of a matrix, wherein Y denotes the number of pixels in a vertical direction of the input image and X denotes the number of pixels in a horizontal direction of the input image.

If the input image is resized having a vertical ratio different from a horizontal ratio, the input image may first be resized in one of a vertical direction and a horizontal direction. According to an example embodiment as shown in FIG. 5, an input image may first be resized in the vertical direction. However, example embodiments are not limited thereto, and instead an input image may first be resized in the horizontal direction.

Referring to FIG. 5, a method of resizing an input image using different vertical and horizontal resizing ratios may include extracting DCT coefficients from a Y×X image (operation S510), calculating N' that satisfies Y:y=N:N' (operation S520), selecting an integer close to N' as N" (operation S530), calculating M' that satisfies X:x=M:M' (S540), selecting an integer close to M' as M" (operation S550), calculating an N"×M" output image using an N"×N" transformation matrix and an M"×M" transformation matrix (operation S560), performing an IDCT on an output image (S570), and performing fine resizing on an N"×M" output image (operation S580).

In operation S510, DCT coefficients of the X×Y input image may be extracted. As described above, the coarse resizing may be performed on the extracted DCT coefficients of the X×Y input image in a DCT domain.

In operation S520, N' may be calculated to determine a target resizing ratio for the vertical direction that satisfies the formula Y:y=N:N'. For example, N may denote a vertical size of a supportable DCT coefficient Matrix. If an 8×8 DCT filter is used, N may be 8.

In operation S530, an integer that is the closest to the calculated N' may be selected as N". For example, if a 1080×1920 image of high definition television (HDTV) is resized to a 360×320 image, N' may be calculated by 1080:360=8:N'. Thus, N' may be 2.67. Because 3 may be the closest integer to 2.67, 3 may be selected as N" in operation S530. For example, an integer selected for N" may be greater than N' so that the image may be downscaled in the fine resizing operation. If N" is smaller than N', the image quality may be degraded because the image may need to be upscaled in the fine resizing operation.

In operation S540, M' may be calculated to determine a target resizing ratio for a horizontal direction that satisfies the formula X:x=M:M'. For example, M may denote a horizontal size of a supportable DCT coefficient matrix. If an 8×8 DCT filter is used, M may be 8.

In operation S550, an integer that is the closest to the calculated M' may be selected as M". For example, if a 1080×1920 image for HDTV is resized to a 360×320 image, M' is calculated by 1920:320=8:M'. Thus, M' may be 1.33. Because 2 may be the closest integer to 1.33, 2 may be selected as M" in operation S550. For example, an integer selected for M" may be greater than M' so that the image may be downscaled in a fine resizing operation. If M" is smaller than M', the image quality may be degraded because the image may need to be upscaled in a fine resizing operation.

For example, N" and M" may denote a size of a DCT filter that may be supported by the system.

In operation S560, an N"×N" transforming matrix and an M"×M" transforming matrix may be calculated using the selected N" and M". Using these transforming matrices, an N"×M" output image may be obtained from the N×M input image. The transformation matrix may select coefficients of lower frequency components from the DCT coefficient matrix of the input image. Such an operation may not require additional processes because the operation may use values stored in memory. Therefore, the transformation matrix may be calculated by deciding a size of a coefficient matrix that may be separated from the DCT coefficient matrix of the input image.

An operation for obtaining the N"×M" output image using the N"×N" transformation matrix and the M"×M" transformation matrix may be performed by extracting a coefficient matrix corresponding to the size of the transformation matrix from the DCT coefficient matrix of the input image. The operation for obtaining the N"×M" output image using the N"×N" transformation matrix and the M"×M" transformation matrix will be described with reference to an example embodiment as shown in FIG. 6.

Figure 6:
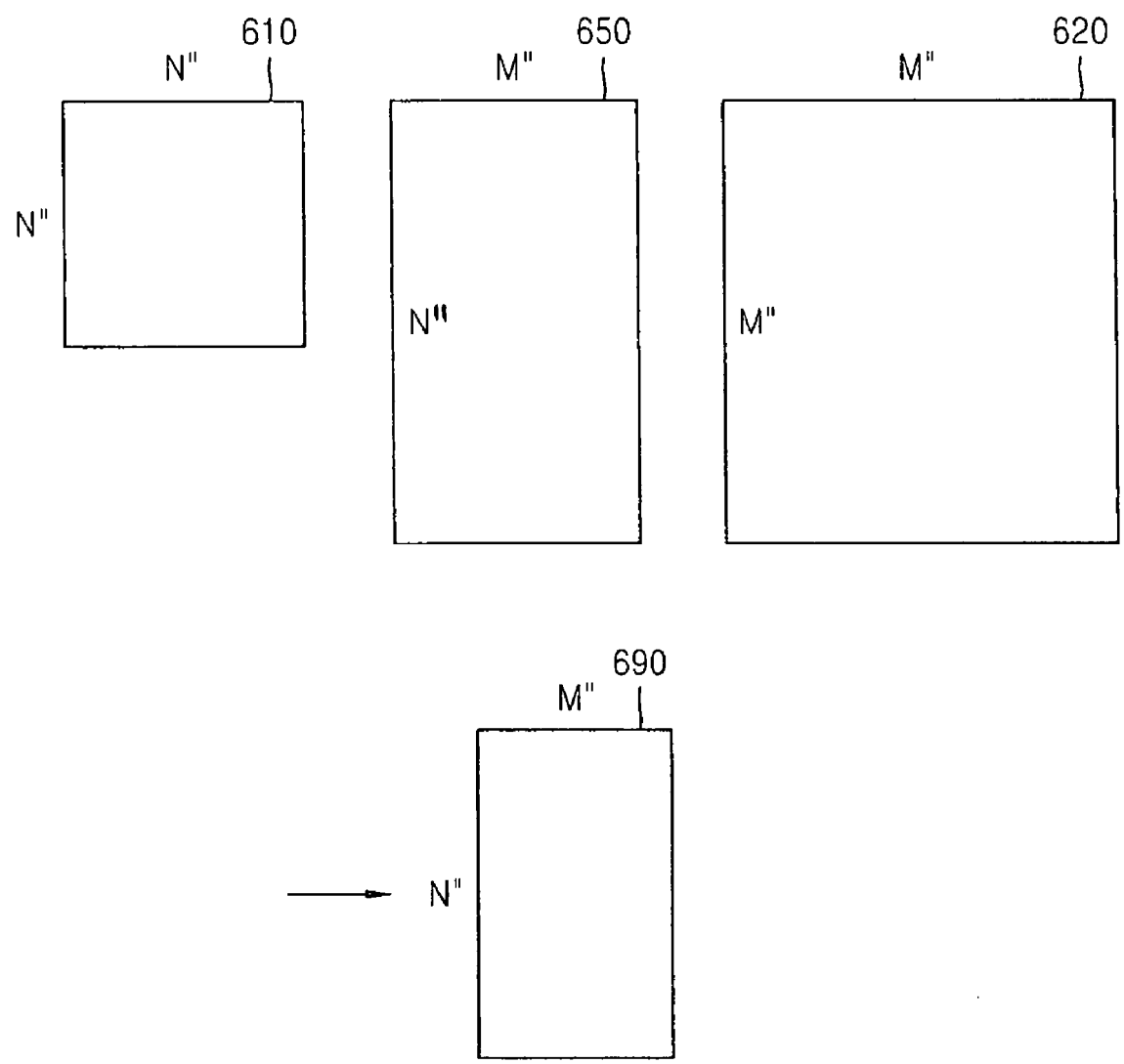
FIG. 6 is a diagram of an operation for obtaining an N"×M" output image using an N"×N" transformation matrix and an M"×M" transformation matrix according to an example embodiment.

With reference to FIG. 6, an input image 650 may be resized in a vertical direction using an N"×N" transformation matrix 610. The input image 650 may be resized in a horizontal direction using the M"×M" transformation matrix 620. The N"×M" output image 690 may be obtained through those resizing operations. As described above, the order of performing the operations for resizing the input image 650 in the vertical direction and in the horizontal direction may be transposed.

In order to schematically show the matrix computation, FIG. 6 shows a predetermined portion of the input image 650 where the matrix computation may be performed. For example, the input image 650 shown in FIG. 6 may be the predetermined portion of the Y×X input image. Thus, the matrix computation may be performed even if the order of applying the N"×N' transformation matrix 610 and the M"×M" transformation matrix 620 are transposed.

Referring again to FIG. 5, in operation S570, an IDCT may be performed on the output image obtained from the matrix computation. By performing the IDCT, spatial domain representations for the N"×M" output image may be obtained. The spatial domain representations may denote pixel values of the output image.

In operation S580, fine resizing may be performed on the N"×M" output image.

According to the example detailed above, the vertical ratio may be 1080:360=8:2.67 and the coarse resizing may have been performed to resize the input image to the ratio of 8:3. The fine resizing may be performed to transform the resulting image of the coarse resizing to an output image using a resizing ratio of 3:2.67. According to the example detailed above, the horizontal ratio may be 1920:320=8:1.33 and the coarse resizing may have been performed to resize the input image to the ratio of 8:2. The fine resizing may be performed to transform the resulting image of the coarse resizing to an output image using a resizing ratio of 2:1.33. However, while the given resizing ratio for the fine resizing may be 3:2.67 and/or 2:1.33, the given ratios may be transformed to integer ratios and the integer ratios may be used for the fine resizing operation.

According to example embodiments, the coarse resizing and the fine resizing may downscale the input image or upscale the input image. The downscaling operation may be a decimation operation for selectively obtaining a predetermined portion of the DCT coefficients of the input image. The upscaling operation may be an interpolation operation for generating a target resizing ratio of an output image through padding zeros in the DCT coefficients of the input image. Therefore, the resizing operation may include the upscaling operation or the downscaling operation, and thus may selectively perform one of the interpolation operation and the decimation operation.

Figure 7A:
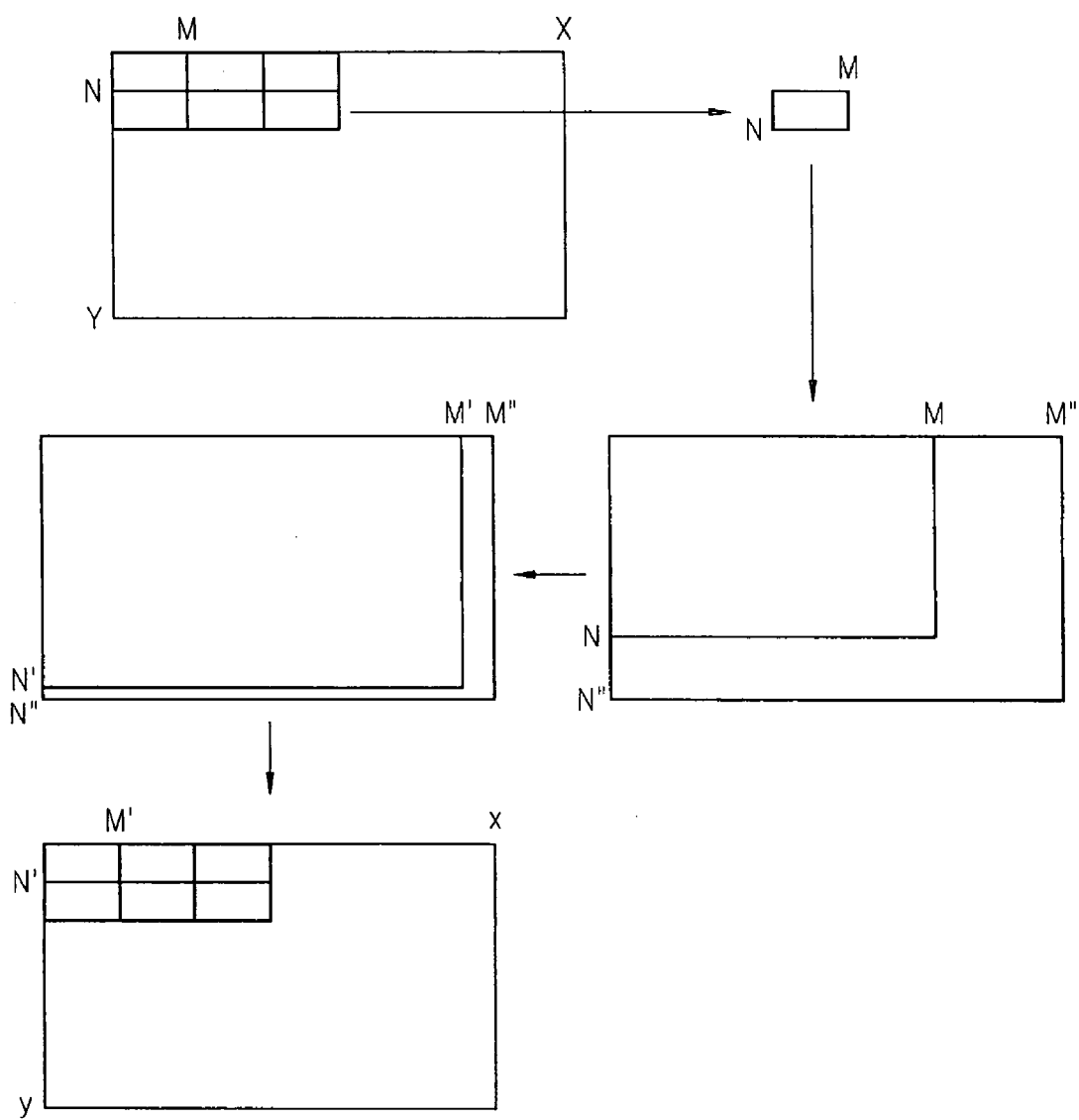
FIG. 7A is a view of a macro block where a downscaling operation is performed based on an image resizing method according to an example embodiment.

FIG. 7A is a view of a macro block on which an upscaling may be performed based on an image resizing method according to an example embodiment.

Referring to FIG. 7A, an N×M macro block may be selected from a Y×X input image. N' and M' may be calculated to satisfy the formulas Y:y=N:N' and X:x=M:M'. Integers close to the calculated N' and M' may be selected as N" and M". For example, integers greater then N' and M' may be selected as N" and M".

The second and third arrows may denote the resizing operations in FIG. 7A. The resizing operation for transforming the N×M macro block to the N"×M" macro block may be the coarse resizing. The resizing operation for transforming the N"×M" macro block to N'×M' macro block may be the fine resizing. The x:y output image may be obtained by arranging the finely resized macro blocks according to the original arrangement.

Figure 7B:
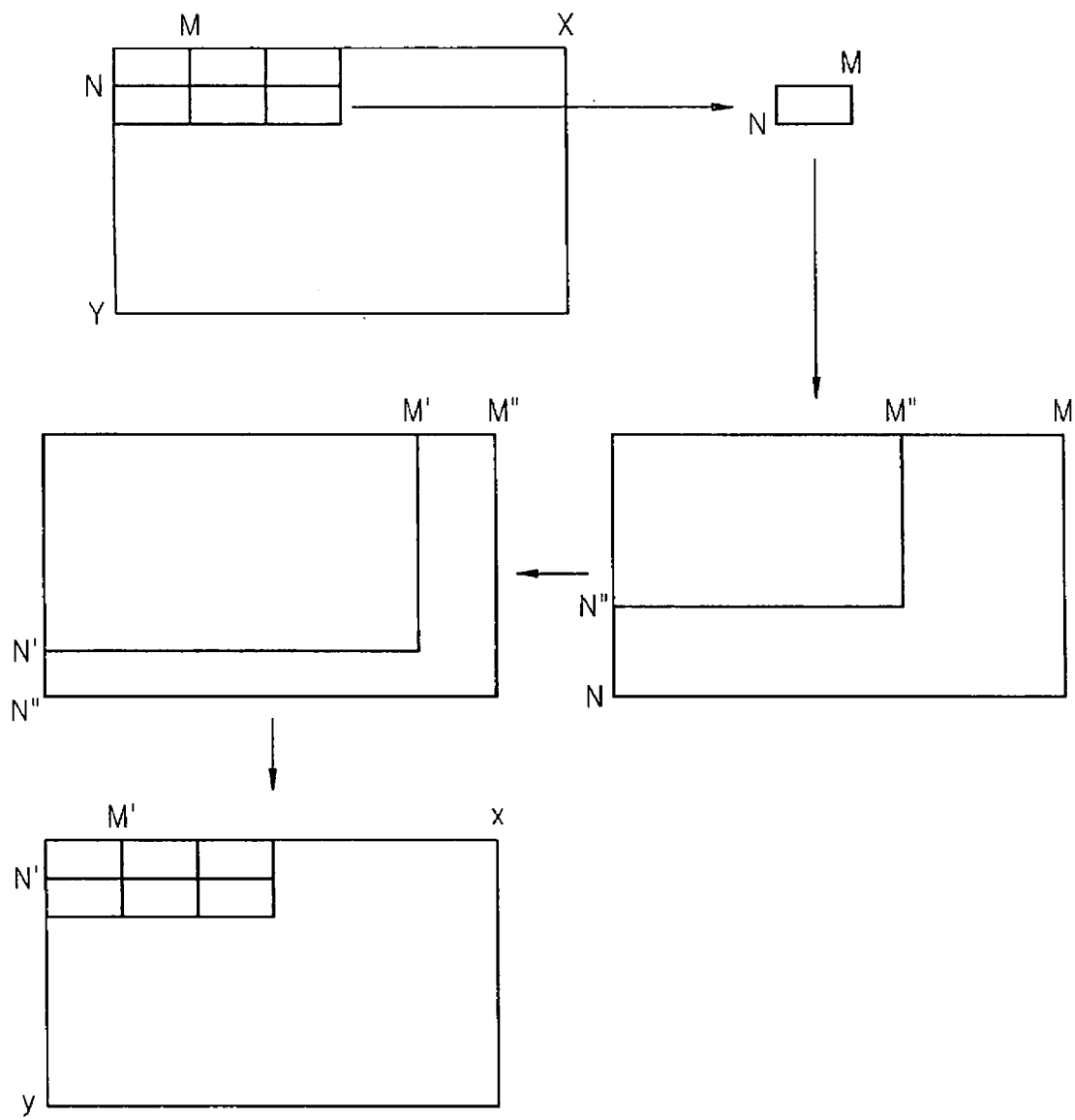
FIG. 7B is a view of a macro block where an upscaling operation is performed based on an image resizing method according to an example embodiment.

FIG. 7B is a view of a macro block where a downscaling may be performed based on an image resizing method according to an example embodiment.

Referring to FIG. 7B, an N×M macro block may be selected from a Y×X input image. N' and M' may be calculated to satisfy the formulas Y:y=N:N' and X:x=M:M'. The operation for selecting integers N" and M" which may be close to the values of N' and M' may be identical to that shown in FIG. 7A. N"×M" macro blocks may be formed by padding zeros in the selected macro blocks.

The second and a third arrows may denote the resizing operation in FIG. 7B. The resizing operation for transforming the N×M macro block to an N"×M" macro block may be the coarse resizing. The resizing operation for transforming the N"×M" macro block to the N'×M' macro block may be the fine resizing. The x:y output image may be obtained by arranging the resized macro blocks according to the original arrangement.

Figure 8:
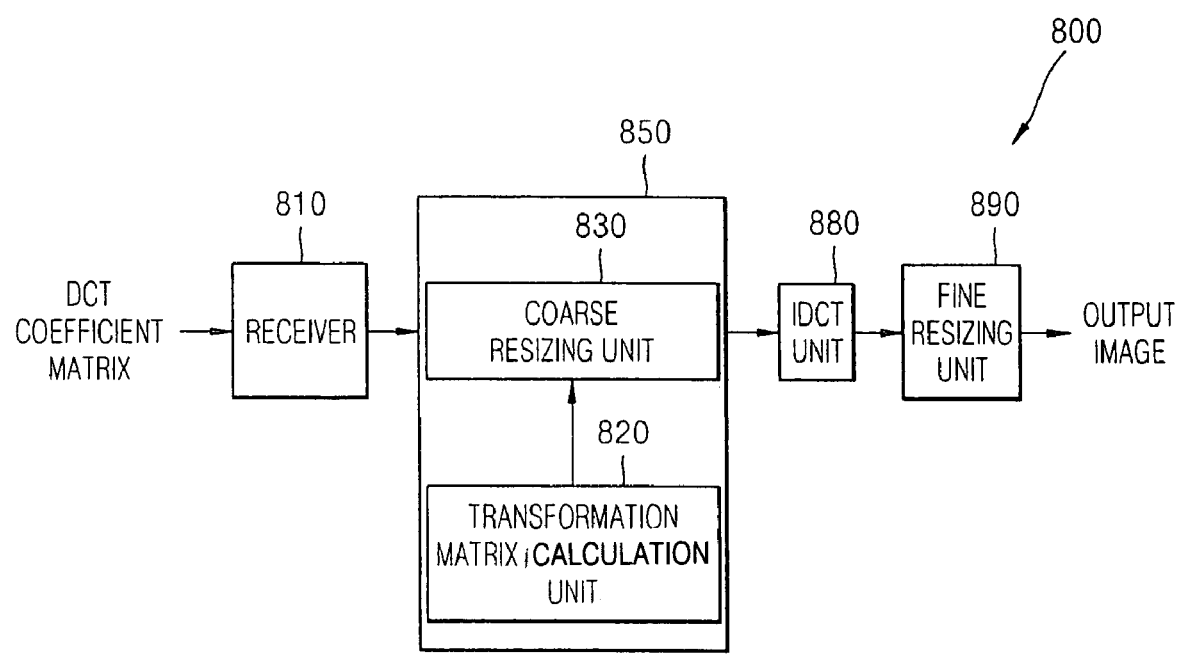
FIG. 8 is a block diagram of an apparatus for resizing an image according to an example embodiment.

FIG. 8 is a block diagram of an apparatus for resizing an image according to an example embodiment.

A resizing apparatus 800 according to an example embodiment may include a receiver 810, a resizing unit 850, an IDCT unit 880 and a fine resizing unit 890. The resizing unit 850 may include a transformation matrix calculation unit 820 and a coarse resizing unit 830.

The receiver 810 may receive DCT coefficients of an input image. The DCT coefficients of the input image may be in the form of a predetermined ratio matrix.

The transformation matrix calculation unit 820 may calculate a transformation matrix for transforming the input image to an aspect ratio that may be close to a predetermined or given resizing ratio. As described above, the transformation matrix may transform the input image to have a size greater than a final size of the target resizing ratio. For example, as shown in FIG. 5, the transformation matrix calculation unit 820 may calculate N' that satisfies the formula Y:y=N:N' and M' that satisfies the formula X:x=M:M'. The transformation matrix calculation unit 820 may select integers close to the calculated N' and M' as N" and M". The transformation matrix calculation unit 820 may calculate an N"×N" transformation matrix and an M"×M" transformation matrix using the selected N" and M".

The coarse resizing unit 830 may perform a coarse resizing on the input image in a DCT domain using the N"×N" transformation matrix and the M"×M" transformation matrix. As a result of the coarse resizing, an image having a resizing ratio close to the target resizing ratio may be obtained.

The IDCT unit 880 may perform an IDCT on the coarse resized domain to obtain a spatial image. The spatial image may be provided to the fine resizing unit 890. The fine resizing unit 890 may perform the fine resizing on the provided spatial image to obtain the output image. For example, one of a bilinear filter or a bicubic filter may be used for the fine resizing as described above.

The resizing apparatus 800 of FIG. 8 may upscale the image and/or downscale the image. To downscale the image, the fine resizing unit 830 of the resizing apparatus 800 may perform a decimation operation. To upscale the image, the fine resizing unit 830 may perform a zero padding operation.

According to example embodiments, input image data may be resized by performing a coarse resizing and a fine resizing operation.

According to example embodiments, an input image may be resized to any predetermined or given ratio by independently resizing the input image data in the DCT domain and the spatial domain.

According to example embodiments, an input image may be resized to a resizing ratio having a vertical ratio different from a horizontal ratio.

While example embodiments have been particularly shown and described, it will be understood by those of ordinary skill in the art that various changes in form and details may be made therein without departing from the spirit and scope as defined by the following claims.

For example, example embodiments may not be limited by the example shown in FIG. 6. Even though the example embodiments may use one of a bilinear filtering and a bicubic filtering in the coarse resizing operation, example embodiments may use other methods to resize the input image data in the spatial domain. Furthermore, in example embodiments, an IDCT may be performed before performing the fine resizing but after performing the coarse resizing. The IDCT may transform an image in the DCT domain to an image in the spatial domain. A scaling operation may be performed in the IDCT to match energy of the input image and the output image.

What is claimed is:

1. A method of resizing an image using a resizing ratio, comprising:
   receiving a DCT (Discrete Cosine Transform) coefficient matrix Y×X of an input image;
   calculating a transformation matrix for transforming the DCT coefficient matrix Y×X of the input image using an integer aspect ratio closest to the target resizing ratio;
   performing a coarse resizing on the DCT coefficient matrix Y×X of the input image in a DCT domain using the transformation matrix;
   obtaining a spatial image by performing an IDCT (Inverse Discrete Cosine transform) on the coarse-resized image; and
   forming an output image having a coefficient matrix y×x by performing a fine resizing on the spatial image in a spatial domain, wherein
   the calculating of the transformation matrix includes:
      calculating N' that satisfies Y:y=N:N' and calculating M' that satisfies X:x=M:M', where N and M are the number of vertical direction coefficients and the number of horizontal direction coefficients in a coefficient matrix of an DCT filter;
      selecting integers N" and M" closest to the calculated decimal fractions N' and M'; and
      calculating an N"×N" transformation matrix and an M"×M" transformation matrix using N" and M",
   Y denotes the number of pixels in a vertical direction of the input image, X denotes the number of pixels in a horizontal direction of the input image, y denotes the number of pixels in a vertical direction of the output image, an x denotes the number of pixel in a horizontal direction of the output image, and
   the performing of the coarse resizing includes calculating an N"×M" transformation matrix of the input image using the N"×N" transformation matrix and the M"×M" transformation matrix.

2. The method of claim 1, wherein performing the fine resizing includes obtaining the output image by performing one of a bilinear filter and a bicubic filtering on the N"×M" transformation matrix.

3. The method of claim 1, wherein the N"×N" transformation matrix and the M"×M" transformation matrix are formed by extracting a portion of DCT coefficients of an N×M transformation matrix, and
   wherein in performing the coarse resizing, the input image is downscaled by performing a decimation on the input image using the N"×N" transformation matrix and the M"×M" transformation matrix.

4. The method of claim 1, wherein the N"×N"transformation matrix and the M"×M" transformation matrix are formed by padding zeroes in the DCT coefficients of an N×M transformation matrix, and
   wherein in performing the coarse resizing, the input image is upscaled by performing an interpolation on the input image using the N"×N" transformation matrix and the M"×M" transformation matrix.

5. The method of claim 1, wherein the DCT filter is an 8×8 DCT filter.

6. The method of claim 1, wherein the N" and the M" are integers closest to the values of N' and the M' and greater than the values of N' and M'.

7. The method of claim 1, wherein the horizontal and vertical resizing ratios are the same.

8. The method of claim 1, wherein the horizontal resizing ratio is different from the vertical resizing ratio.

9. An apparatus for resizing an input image using a resizing ratio, comprising:
   a receiver for receiving a DCT (discrete cosine transform) coefficients matrix Y×X of an input image;
   a transformation matrix calculation unit for calculating a transformation matrix for transforming the DCT coefficient matrix Y×X of the input image using an integer aspect ratio closest to the resizing ratio;
   a coarse resizing unit for performing a coarse resizing on the DCT coefficient matrix Y×X of the input image in a DCT domain using the transformation matrix;
   an IDCT (inverse discrete cosine transform) unit for obtaining a spatial image by performing an IDCT on the coarse-resized image; and
   a fine resizing unit for forming an output image having a coefficient matrix y×x by performing a fine resizing on the spatial image in a spatial domain, wherein
   the transformation matrix calculation unit calculates N' that satisfies Y:y=N:N' and calculates M' that satisfies X:x=M:M', wherein N and M are the number of vertical direction coefficients and the number of horizontal direction coefficients in a coefficient matrix of an DCT filter, selects integers N" and M" closest to the calculated decimal fractions N' and M', and calculates an N"×N" transformation matrix an M"×M" transformation matrix using N" and M",
   Y denotes the number of pixels in a vertical direction of the input image, X denotes the number of pixels in a horizontal direction of the input image, y denotes the number of pixels in a vertical direction of the output image, and x denotes the number of pixels in a horizontal direction of the output image, and the coarse resizing unit calculates an N"×M" transformation matrix of the input image using the N"×N" transformation matrix and the M"×M" transformation matrix.

10. The apparatus of claim 9, wherein the fine resizing unit obtains the output image by using one of a bilinear filter and a bicubic filter on the N"×M" transformation matrix.

11. The apparatus of claim 9, wherein the N"×N" transformation matrix and the M"×M" transformation matrix are formed by extracting a portion of DCT coefficients of an N×M transformation matrix, and wherein the coarse resizing unit downscales the input image by performing a decimation on the input image using the N"×N" transformation matrix and the M"×M" transformation matrix.

12. The apparatus of claim 9, wherein the N"×N" transformation matrix and the M"×M" transformation matrix are formed by performing a zero padding on an N×M transformation matrix, and wherein the coarse resizing unit upscales the input image by performing an interpolation on the input image using the N"×N" transformation matrix and the M"×M" transformation matrix.

13. The apparatus of claim 9, wherein the DCT filter is an 8×8 DCT filter.

14. The apparatus of claim 9, wherein the values of N" and M" are integers closest to the values of N' and M' and greater than the values of N' and M'.

15. The apparatus of claim 9, wherein the horizontal and vertical resizing ratios are the same.

16. The apparatus of claim 9, wherein the horizontal resizing ratio is different from the vertical resizing ratio.

17. A method of resizing an image using a resizing ratio, comprising:

receiving a DCT (Discrete Cosine Transform) coefficient matrix Y×X of an input image;

calculating a transformation matrix for transforming the DCT coefficient matrix Y×X of the input image using an integer aspect ratio closest to the target resizing ratio;

performing a coarse resizing on the DCT coefficient matrix Y×X of the input image in a DCT domain using the transformation matrix;

obtaining a spatial image by performing an IDCT (Inverse Discrete Cosine transform) on the coarse-resized image; and forming an output image having a coefficient matrix y×x by performing a fine resizing on the spatial image in a spatial domain, wherein the calculating of the transformation matrix includes:

calculating N' that satisfies Y:y=N:N' and calculating M' that satisfies X:x=M:M', where N and M are the number of vertical direction coefficients and the number of horizontal direction coefficients in a coefficient matrix of an DCT filter;

selecting integers N" and M" closest to the calculated decimal fractions N' and M'; and calculating an N"×N" transformation matrix and an M"×M" transformation matrix using N" and M", Y denotes the number of pixels in a vertical direction of the input image, X demotes the number of pixels in a horizontal direction of the input image, y denotes the number of pixels in a vertical direction of the output image, an x denotes the number of pixel in a horizontal direction of the output image.

18. The method of claim 17, wherein, the performing of the coarse resizing includes calculating an N"×M" transformation matrix of the input image using the N"×N" transformation matrix and the M"×M" transformation matrix the performing the fine resizing includes obtaining the output image by performing one of a bilinear filter and a bicubic filtering on the N"×M" transformation matrix.

19. The method of claim 18, wherein the N"×N" transformation matrix and the M"×M" transformation matrix are formed by extracting a portion of DCT coefficients of an N×M transformation matrix, and wherein in performing the coarse resizing, the input image is downscaled by performing a decimation on the input image using the N"×N" transformation matrix and the M"×M" transformation matrix.

20. The method of claim 18, wherein the N"×N" transformation matrix and the M"×M" transformation matrix are formed by padding zeroes in the DCT coefficients of an N×M transformation matrix, and wherein in performing the coarse resizing, the input image is upscaled by performing an interpolation on the input image using the N"×N" transformation matrix and the M"×M" transformation matrix.

* * * * *